(12) United States Patent
Nylander et al.

(10) Patent No.: US 8,553,661 B2
(45) Date of Patent: Oct. 8, 2013

(54) METHOD AND ARRANGEMENT IN A TELECOMMUNICATION SYSTEM TO INDICATE CHARACTERISTICS OF AN ACCESS NODE TO A MOBILE TERMINAL

(75) Inventors: Tomas Nylander, Varmdo (SE); Mats Buchmayer, Stockholm (SE); Jari Vickberg, Jarna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 384 days.

(21) Appl. No.: 12/673,532

(22) PCT Filed: Aug. 13, 2008

(86) PCT No.: PCT/SE2008/050919
§ 371 (c)(1),
(2), (4) Date: Feb. 15, 2010

(87) PCT Pub. No.: WO2009/022980
PCT Pub. Date: Feb. 19, 2009

(65) Prior Publication Data
US 2010/0165867 A1    Jul. 1, 2010

Related U.S. Application Data (60) Provisional application No. 60/974,615, filed on Sep. 24, 2007.

(30) Foreign Application Priority Data

Aug. 15, 2007   (SE) ...................................... 0701873

(51) Int. Cl.
  *H04J 1/16*   (2006.01)
  *H04W 4/00*   (2009.01)
  *H04W 40/00*  (2009.01)
  *H04W 84/12*  (2009.01)
  *H04W 16/18*  (2009.01)

(52) U.S. Cl.
  CPC .............. *H04W 84/12* (2013.01); *H04W 16/18* (2013.01)
  USPC ........................... 370/338; 370/252; 455/446

(58) Field of Classification Search
  USPC ............ 370/252, 328, 338; 455/422.1, 432.1, 455/432.3, 435.1, 435.2, 445, 446
  See application file for complete search history.

(56) References Cited

U.S. PATENT DOCUMENTS

2007/0270152 A1 * 11/2007 Nylander et al. ............. 455/445
2008/0045213 A1 * 2/2008 Norris et al. ............... 455/435.1

(Continued)

FOREIGN PATENT DOCUMENTS

| EP | 1411741 A1 | 4/2004 |
|----|------------|--------|
| JP | H09224282 A | 8/1997 |

(Continued)

OTHER PUBLICATIONS

3rd Generation Partnership Project. "LS on Closed Subscriber Groups for LTE Home Cells." 3GPP TSG RAN WG2 Meeting #58bis, R2-072991, Orlando, USA, Jun. 25-29, 2007. pp. 1-3, R2-072991.

3rd Generation Partnership Project. "LS on Closed Subscriber Groups for LTE Home Cells." 3GPP TSG RAN WG3 Meeting #57, R3-071320, Athens, Greece, Aug. 20-24, 2007.

(Continued)

*Primary Examiner* — Paul H Masur
(74) *Attorney, Agent, or Firm* — Coats & Bennett, P.L.L.C.

(57) ABSTRACT

A solution for indicating cell characteristics that apply specifically for a mobile o terminal (3) accessing a radio cell (4) of a network node (1) in a telecommunications system (10) is described herein. The solution is provided in methods and devices for providing and handling a node identifier string with mobile terminal cell specific properties to the mobile terminal. The node identifier string may be provided in a radio resource control communication message.

16 Claims, 6 Drawing Sheets

(56) References Cited

U.S. PATENT DOCUMENTS

| | | | |
|---|---|---|---|
| 2008/0267153 A1* | 10/2008 | Mukherjee et al. | 370/338 |
| 2009/0011757 A1* | 1/2009 | Tenny | 455/425 |
| 2010/0182963 A1* | 7/2010 | Fischer et al. | 370/329 |

FOREIGN PATENT DOCUMENTS

| | | | |
|---|---|---|---|
| JP | 2002135825 A | 5/2002 |
| JP | 2004159304 A | 6/2004 |
| JP | 2004260429 A | 9/2004 |
| JP | 2005101976 A | 4/2005 |
| WO | 2007/136339 A2 | 11/2007 |

OTHER PUBLICATIONS

3rd Generation Partnership Project. 3GPP TR 25.820 V0.1.0 (Jun. 2007). 3rd Generation Partnership Project; Technical Specification Group Radio Access Networks; 3G Home NodeB Study Item Technical Report (Release 8). Jun. 2007.

\* cited by examiner

METHOD AND ARRANGEMENT IN A TELECOMMUNICATION SYSTEM TO INDICATE CHARACTERISTICS OF AN ACCESS NODE TO A MOBILE TERMINAL

TECHNICAL FIELD

The present invention relates to methods and arrangements in a telecommunication system, in particular it relates to methods and arrangements for indicating cell characteristics that apply for a mobile terminal accessing a radio cell of a network node in a telecommunications system.

BACKGROUND

Specification is ongoing in 3GPP for Evolved Universal Terrestrial Radio Access Network (E-UTRAN), the next generation of Radio Access Network. A base station in this concept is called eNB (eNodeB, E-UTRAN NodeB). An E-UTRAN base station adapted to provide home or small area coverage for a limited number of users is called Home eNodeB (HeNB) in the context of this document.

A HeNB provides radio coverage for the end users and is connectable to the mobile core network using some kind of IP based transmission. The coverage area provided is relatively small.

One of the advantages with this way of providing Local Access is related to providing lower call or transaction rates/charges when connected via the HeNB compared to when connected via the eNB. This however creates a new problem or requirement, to also indicate to the end users when coverage and service is provided by a specific HeNB.

An attempt to handle local access services has been presented for circuit switched networks for GSM as may be seen in ETSI standard document TR 10.43 V1.0.0. However, this solution relates to overall cell specific services for all users in the cell.

SUMMARY

The present invention aims at providing a solution that alleviates at least one of the problems indicated above.

It is therefore an object of the present invention to provide a method and arrangement in a network node of a telecommunications system for indicating radio cell characteristics that apply for a mobile terminal accessing the cell of that node.

It is furthermore an object of the present invention to provide a method and an arrangement in a mobile terminal accessing a radio network cell of a telecommunications system for indicating characteristics of that cell on that terminal.

At least one of the above objects is achieved with the methods, the network node or the mobile terminal according to the appended independent claims.

Further objects and advantages are evident from the dependent claims.

The objects of the present invention are provided in a number of aspects in which a first is a method in a radio network access node in a radio access network, for indicating characteristics of a cell of the radio network access node to a mobile terminal accessing the cell through the radio network access node by providing a node identifier string to the terminal from the radio network access node, the identifier string being indicative of cell specific properties specifically applicable with the mobile terminal within the cell.

The cell properties may comprise at least one of a node identity text string, cell identity text string, charge tariff data, cell performance data, and an application or service function, such as local switching to one or several other node users.

The method may further comprise steps of:
receiving a Radio Resource Control, i.e. RRC, connection request message from the mobile terminal;
providing the node identifier string in an RRC connection setup message; and transmitting the RRC connection setup message.

The method may further comprise a step of broadcasting an information message periodically in the cell and wherein the broadcasted information message is arranged to trigger the RRC connection request. The broadcasted information message may comprise a flag or similar data unit in a message, such as a data bit of a certain value.

The method may further comprise a step of providing the node identifier string to the terminal in a handover command message during a handover procedure from another cell to said cell. The node identifier string may be forwarded to the terminal from a node of said other cell following being received therein comprised in a handover request acknowledge message from the node of said cell to the node of the other cell.

Another aspect of the present invention is provided, a method implemented in a mobile terminal accessing a radio network access cell in a radio access network, for indicating characteristics of said cell on said terminal, the method comprising the steps of:
receiving a node identifier provided from a network access node of the cell, the node identifier being indicative of cell specific properties specifically applicable with said terminal within the cell;
matching the received node identifier with a pre stored node identifier associating to a set of terminal specific cell properties being pre stored in a memory space of the terminal.

The method may further comprise steps of:
obtaining a node identifier string from the network access node if the received node identifier is matched to the pre stored node identifier;
associating the obtained node identifier string with the received node identifier; and
using the obtained node identifier string in the terminal.

The step of obtaining a node identifier string from the network access node may comprise receiving a radio resource control connection setup message comprising the node identifier string.

Yet another aspect of the present invention is provided, an access node of a telecommunications network capable of indicating characteristics of a radio cell of said node to a mobile terminal accessing the cell wherein the access node is arranged to provide a node identifier string to the terminal from the access node, the identifier string being indicative of cell specific properties specifically applicable with the terminal within the cell.

Still another aspect of the present invention is provided, a mobile terminal accessing a radio cell of an network access node in a telecommunications network and capable of indicating characteristics of the cell, wherein the terminal is arranged to receive a node identifier string provided from the network access node of the cell, the node identifier string being indicative of cell specific properties specifically applicable with the terminal within the cell and further arranged to compare the received node identifier with a pre stored, in the memory of the terminal, node identifier associating to a set of terminal specific cell properties being pre stored in a memory space of said terminal. The terminal further being arranged to obtain a node identifier string and associate the obtained node identifier string with the pre stored node identifier.

It goes without saying that the above aspects of the invention may be combined in the same embodiment.

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION OF PREFERRED EMBODIMENTS

Figure 1:
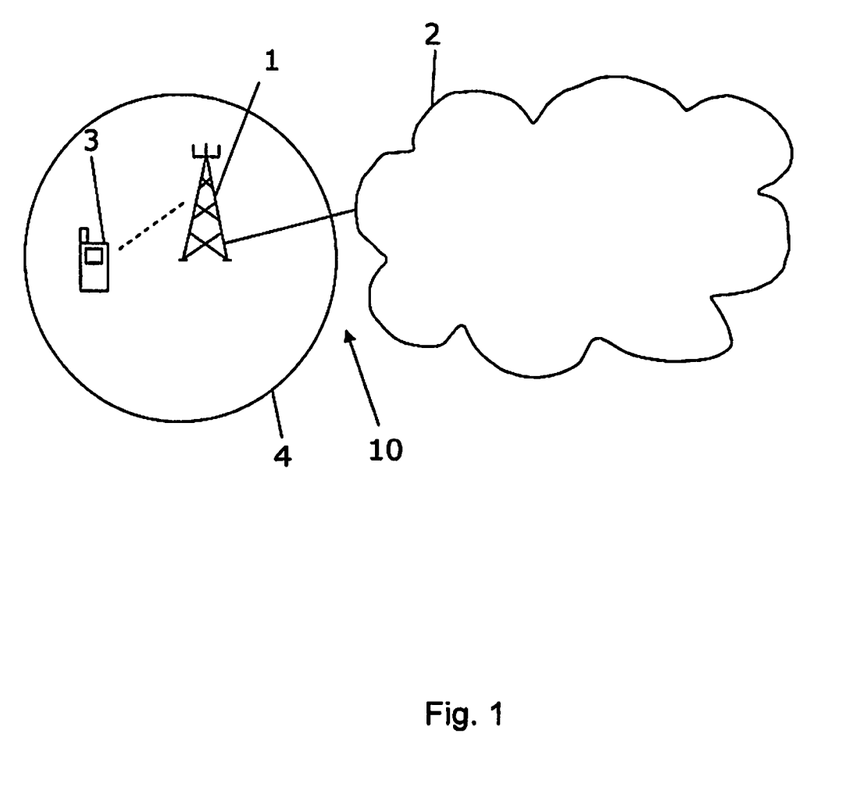
FIG. 1 illustrates schematically a network according to the present invention.

In FIG. 1 reference numeral 10 generally indicates a telecommunications access network within which the solution according to the present invention is used; the network preferably being an Long Term Evolution (LTE), also known as E-UTRAN, compatible network, i.e. a packet-optimized radio-access network; however other network solutions may be applicable such as GSM or 3G Wideband Code Division Multiple Access (WCDMA) based networks. The access network comprise a base station 1 or similar radio network access gateway providing user equipment (UE) 3, for instance a mobile terminal, access to some infrastructure and/or communication network 2, for instance an Internet Protocol (IP) based network such as Internet. In the Long Term Evolution (LTE) concept the base station is often referred to as evolved NodeB (eNB) and in 3G WCDMA it is referred to as NodeB (NB). It should be appreciated that other devices and units may be present in the network for handling communication with a UE depending on infrastructure network configuration and type of communication protocol(s) involved. The eNB is arranged to cover a certain geographical area (cell) 4 with radio connectivity. The UE connects to the eNB using control and communication protocol messages as defined for particular communication protocol architectures used.

In order to ease the understanding and reading of this document the term eNB will be used including both NB and eNB.

The eNB 1 may be configured for being a so called Home eNB (HeNB) as discussed in the background section. The HeNB may provide services to a Closed Subscriber Group (CSG).

A CSG identifies subscribers of an operator, who are permitted to access one or more E-UTRAN cells of the Public Land Mobile Network (PLMN) but which have restricted access. These cells are called "CSG cells". Every CSG cell broadcasts a specific CSG identity as part of the system information. A CSG cell is accessible by the members of the closed subscriber group for that CSG identity. The CSG identity is used by the UEs to facilitate access for authorised members of the associated Closed Subscriber Group. Each UE also contains a CSG white list that is a list stored in the USIM containing all the CSG IDs of the CSG cells to which the subscriber belongs. The UE can determine whether it is allowed to access a specific CSG cell by comparing the CSG identity broadcasted in that CSG cell to the contents of the CSG white list i.e. if the broadcasted CSG identity is part of the CSG white list, the UE may access the CSG cell.

Figure 2:
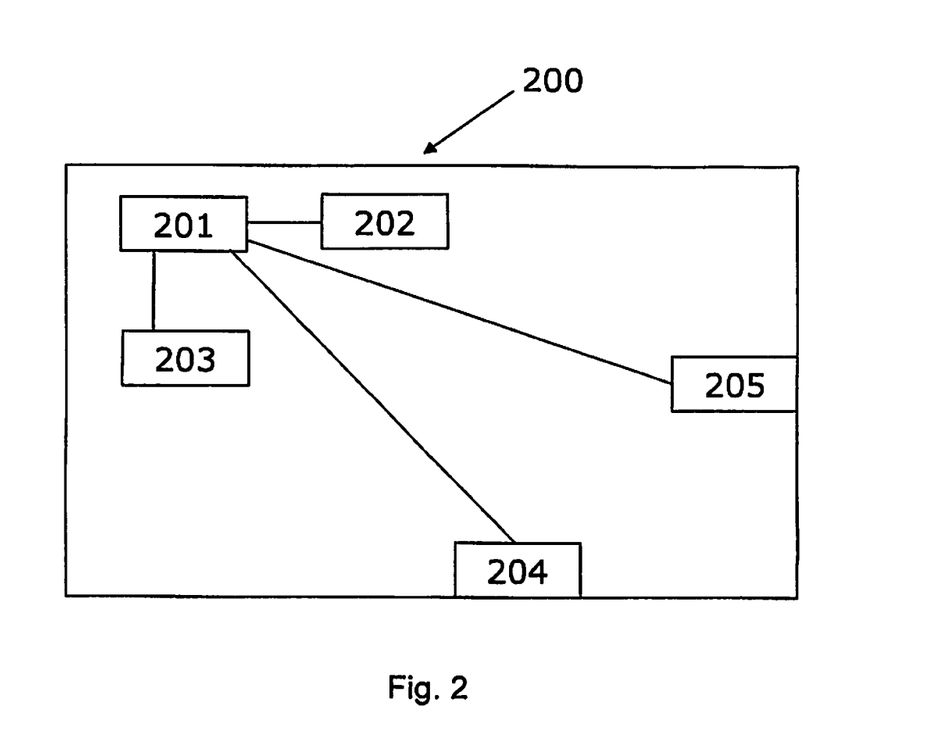
FIG. 2 illustrates schematically a device according to the present invention.

Referring to FIG. 2, a HeNB 200 may comprise at least one processing unit 201 arranged to operate hardware or software instructions for handling communication signals (both control and user specific signals). The processing unit may use a volatile memory unit 202 and/or a non-volatile memory unit 203 during operation of the instructions. Furthermore, the HeNB comprise at least one radio interface 204 for communication with UE on a wireless communication channel and at least one network communication interface 205 for communication with the infrastructure network.

The term node identifier used in this document may be an eNB identifier (eNB-ID), a Cell Identity (CI), a CSG identity (CSG-ID) or a Tracking Area (TA) Identity (TAI) or any combination of these. The node identifier is normally broadcasted as part of the system information by the HeNB but may also be transferred to the UE in dedicated mode.

The cell specific properties applicable for a specific UE comprise at least one of a node identity text string, cell identity text string, tariff data, cell performance data, and an application or service function, such as local switching to one or several other node users. The cell performance data may for example comprise data on cell coverage or cell throughput. In the rest of this document the term "HeNB Identifier string" is used to describe any combination of the above described cell specific properties applicable for a specific UE. A more general term for HeNB identifier string is a node identifier string.

When a UE start use a HeNB it is advantageous to provide information concerning the network and the HeNB to the UE. The UE may then, for the sake of informing of cell access, display the HeNB identifier string of text or data when camping, i.e. being connected to the HeNB on this cell, in favor of or in conjunction with possible strings received from the core network.

If a UE enters the HeNB cell coverage in an idle state the UE might not necessarily perform any signaling and hence the HeNB may not know about the UE and the network may not be able to inform the UE about the HeNB identifier string, this issue is addressed below.

There are several alternative embodiments possible within the scope of the invention as claimed for possible ways for the UE to obtain and display the HeNB identifier string. These are further described below.

In one embodiment, the Radio Resource Control (RRC) messages used between the network and UE used to gain access to the network is enhanced to provide the HeNB identifier string.

In other embodiments the System Information Broadcast messages from the HeNB is enhanced to trigger the provisioning of the HeNB identifier string to the UE.

Other embodiments of the present invention include providing the end user of the UE with the possibility to configure the UE with the information to be displayed thereon.

Transfer of HeNB Identifier String at First RRC Activity

An implementation of the HeNB identifier string transfer may, according to one embodiment of the invention, be to include it into the first RRC signaling flow initiated in the HeNB cell for a particular UE. This may mean that a UE initially may be camping at the HeNB cell but still not be displaying the HeNB identifier string. The HeNB identifier string may however be exchanged at any RRC activity, such as triggered by a bearer or call setup, SMS sending/receiving etc. so the user may then be informed about the HeNB identifier string of the current cell. The HeNB identifier string received from the HeNB is then associated with this cell in the UE for subsequent camping at this cell and may hence be displayed without RRC activity. This is based on the node identity/identifier received as broadcasted system information in the current cell and then associating the HeNB identifier string received at RRC level with that node identity. Effectively, this means that the UE maintains a mapping or comparison table between node identity information and the associated HeNB identifier string. I.e. upon re-entry to the HeNB cell the UE may read the broadcasted node identity and know based on the mapping table contents that it is camping on a HeNB cell and can display the HeNB identifier string associated with that node identity from the mapping table to the end user. In case the HeNB identifier string is changed the UE, and the mapping table in the UE, may be updated at next RRC activity.

Figure 3:
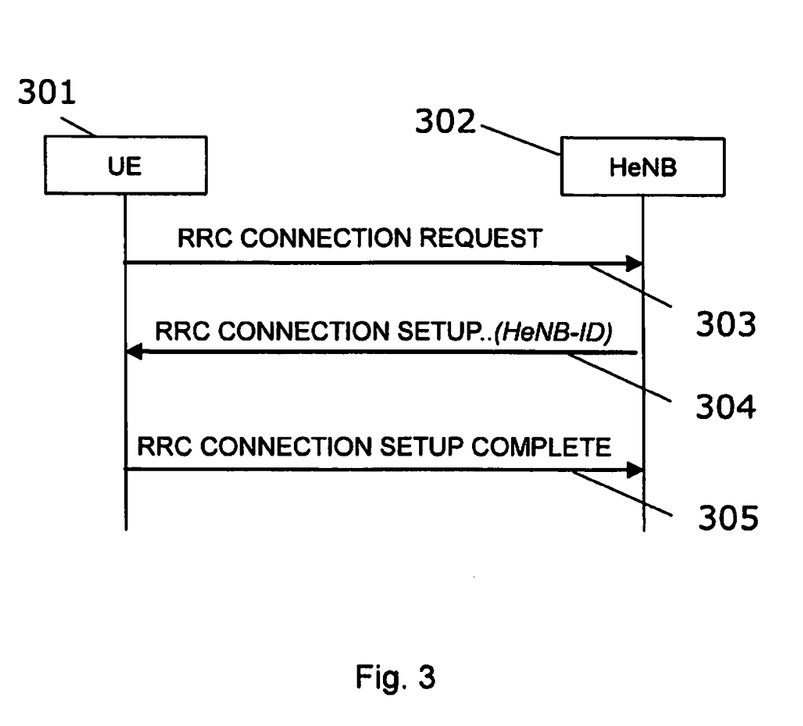
FIG. 3 illustrates schematically in an event diagram an RRC connection establishment procedure for E-UTRAN (LTE) according to one embodiment of the invention.

FIG. 3 shows, as an example, an RRC connection establishment procedure for E-UTRAN i.e. LTE. It shows how HeNB identifier string (HeNB-ID) may be conveyed to the UE 301 from a HeNB 302 in the RRC CONNECTION SETUP message. An RRC CONNECTION REQUEST message is sent 303 from the UE to the HeNB.

As a response, an RRC CONNECTION SETUP message (with HeNB-ID) is sent 304 from the HeNB to the UE. The UE analyzes the content of the RRC CONNECTION SETUP message and compares with entries stored in the UE relating to HeNB for the UE. Suitable information is shown in the display of the UE. Finally, an RRC CONNECTION SETUP COMPLETE message is sent 305 from the UE to the HeNB to finalize the connection establishment procedure.

Transfer of HeNB Identifier String at Arrival in HeNB Cell

Another embodiment of the invention involves triggering the RRC activity needed to facilitate the transfer of the HeNB identifier string. One way of triggering such transfer may be to force an RRC signaling upon an UE entering a HeNB cell. This may for instance be triggered by a Tracking Area (TA) allocation meaning that the UE may be triggered to perform a TA Update (TAU) always when camping on a HeNB cell; TAU is always initiated by establishing the RRC connection as described above for the former example. Another alternative embodiment may be to have a 'flag' or similar information message, broadcasted as part of system information that may be interpreted as 'perform RRC establishment if access to the HeNB cell is allowed'. This flag alternative may in the most optimized case mean that the UE only establishes the RRC connection to retrieve the HeNB identifier string and then no further communication (e.g. towards the core network) is needed and the RRC connection may be released. Furthermore, a user of the UE may trigger the transfer manually by interacting with the UE.

The above optimization is preferred as forcing Tracking Area Update (TAU) may require more of network signaling and in the case of TA allocation additional operator Operation and Maintenance control (O&M) might be needed.

Figure 4:
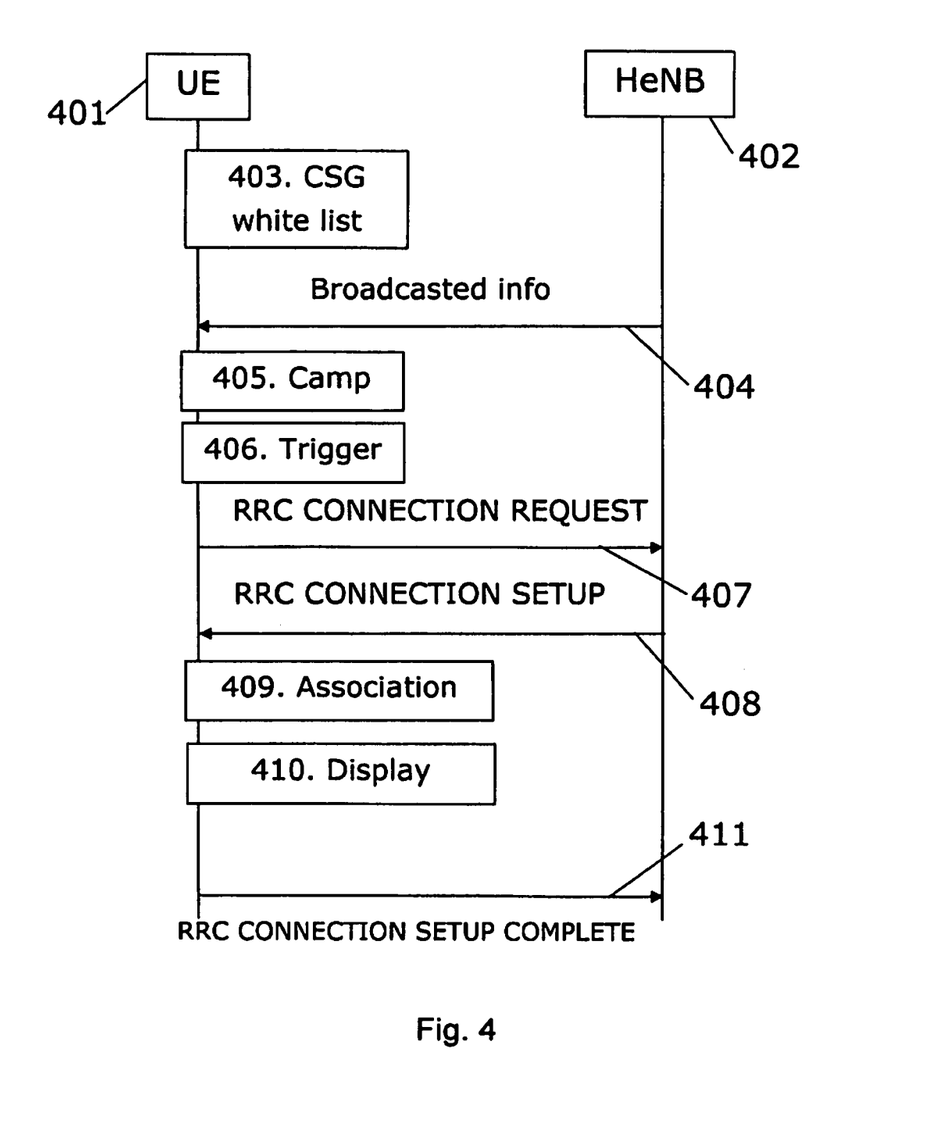
FIG. 4 shows schematically a flow chart of an embodiment of the present invention.

The procedure exemplified in FIG. 4 shows a flow chart of initial access of a UE 401 to a HeNB 402 using an example of being in an allowed CSG cell (Closed Subscriber Group), and creation of the string association in the CSG white list for a particular CSG cell. The UE 401 comprises a CSG white list 403 comprising e.g. one allowed CSG, identified by it's CSG identity, for example CSG-Id-5. No HeNB identifier string is associated with the CSG. The HeNB broadcasts a system information message 404 and the UE reads the CSG identity from the broadcasted system information (i.e. CSG-ID-5) from the HeNB. Assuming that the CSG-ID-5 is included in the CSG white list, the UE is allowed to camp 405 on the CSG cell.

Upon any suitable trigger 406 to establish RRC connection to the HeNB, this may occur instantly or later on, an RRC CONNECTION REQUEST message 407 is sent from UE to the HeNB. In response an RRC CONNECTION SETUP message 408 comprising the HeNB identifier string, e.g. {"HeNB-5"}, is sent from the HeNB to the UE.

The UE then associates 409 the received HeNB identifier string with an item in the white list, e.g. {"HeNB-5"} with CSG-ID-5; i.e. updates the CSG white list with the HeNB identification string. The UE displays 410 the received HeNB identifier string to the end user e.g. on a Graphical User Interface (GUI) of the UE.

The UE sends 411 an RRC CONNECTION SETUP COMPLETE message to the HeNB.

Figure 5:
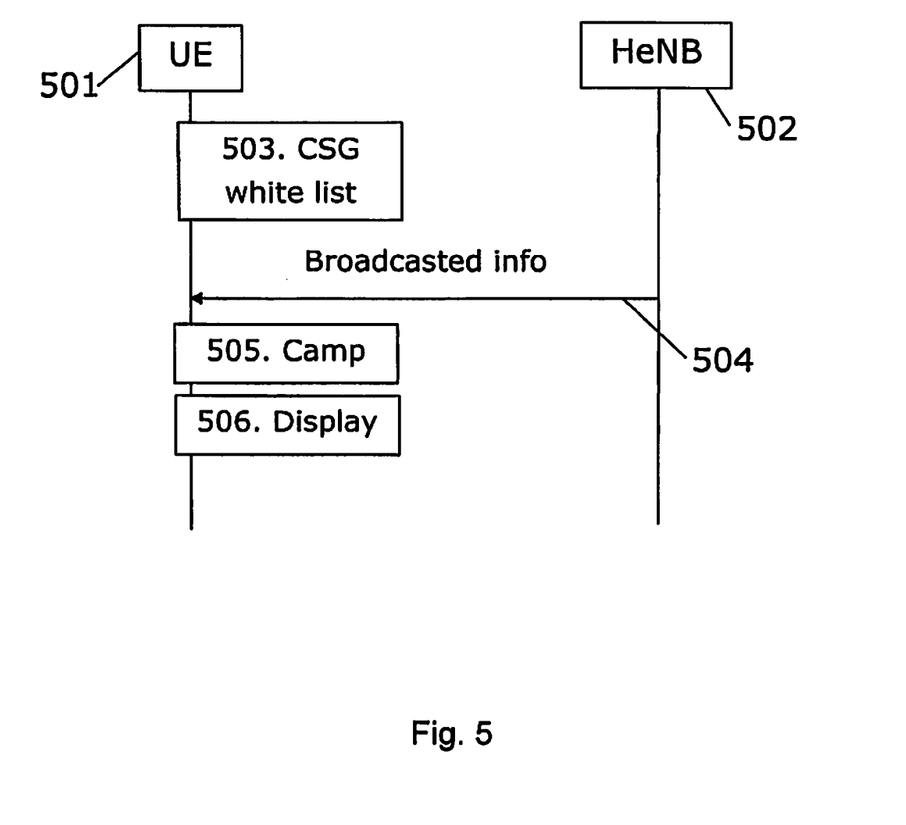
FIG. 5 shows schematically a flow chart of another embodiment of the present invention.

FIG. 5 shows a flow chart of consecutive access to an allowed CSG cell and usage of the string association in the CSG white list between a UE 501 and HeNB 502. The CSG white list 503 in the UE comprises one allowed CSG: e.g. {CSG-ID-5, "HeNB-5"}.

The UE reads 504 the CSG identity from the system information broadcasted from the HeNB, for instance CSG-Id-5. The CSG-Id-5 is included in the CSG white list and UE is allowed to camp 505 on the CSG cell. The UE displays 506 the HeNB identifier string stored in the CSG white list to the end user, e.g. in the GUI of the UE.

Provisioning of HeNB Identifier String in UE

An alternative method of performing the mapping between the node identity and the HeNB identifier string, i.e. the text string displayed in UE, may be to configure or customize the UE with the HeNB identifier string to display when the UE camps on an allowed HeNB cell. However if the HeNB identifier string to display should be possible to control by the 'owner' of the HeNB this may require additional functionality and support to update the HeNB identifier string in the UEs.

The text string, i.e. the HeNB identifier string, to be displayed is based on the node identity broadcasted in a system information message. In this case the UE reads the node identity from the system information message to check whether the user of the UE has configured any text string for this node identity.

To further enhance this method and to ensure that the end user configures the HeNB identifier string for the correct HeNB, i.e. in the case of multiple HeNBs being in the vicinity, it may be beneficial if the broadcasted node identity is based on information printed on the HeNB or otherwise known to the end user. For example, a serial number may be printed on the HeNB or the operator may provide the end user with this information in written format. This latter option also works for the case when the HeNB is equipped with a Universal Subscriber Identity Module (U) SIM card to provide the needed identities.

HeNB Identifier String Handling in Active or Connected State (RRC_CONNECTED)

In case the UE is in active state, one embodiment of the invention may comprise that the HeNB identifier string may be handled by the handover procedure, e.g. handover from the macro layer, from a source eNB to a target HeNB or handover from a source HeNB to a target HeNB. That is, when the UE is handed over to the target HeNB cell the HeNB identifier string may be received and the text string may be displayed in the UE.

Figure 6:
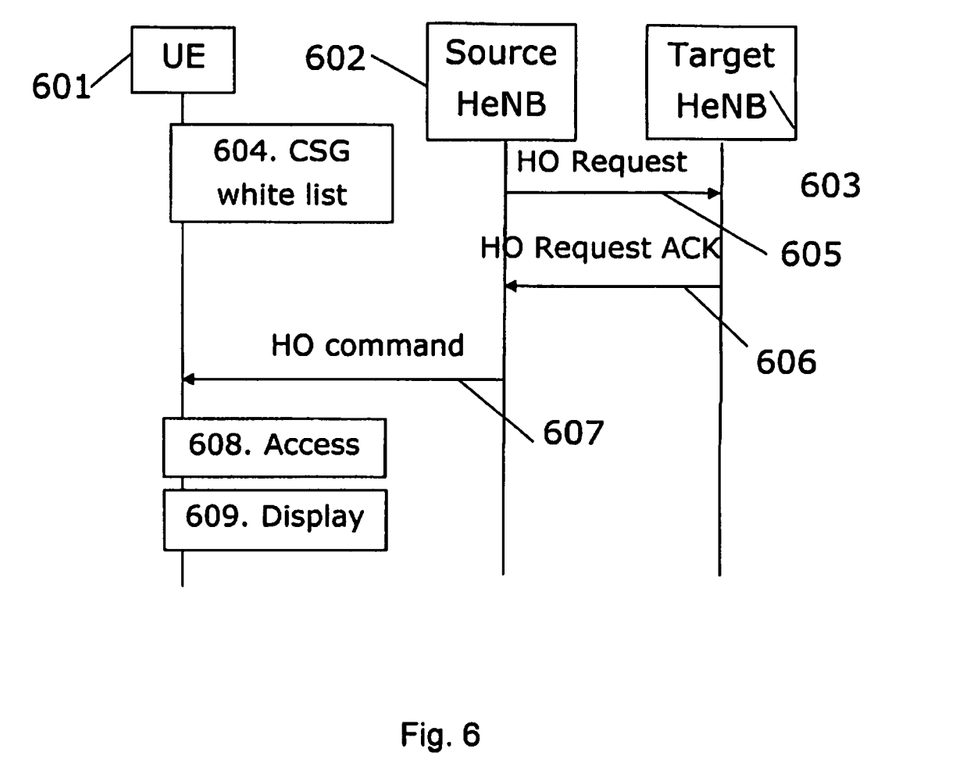
FIG. 6 shows schematically a flow chart of another embodiment of the present invention.

FIG. 6 shows a possible implementation of this embodiment, where the UE 601 comprises a CSG white list 604, which comprises, e.q., one allowed CSG, identified by it's CSG identity. In this embodiment, the source eNB/HeNB 602 sends 605 a HANDOVER REQUEST message to the target HeNB 603, the target HeNB provides the HeNB Identifier string as an information element in a 'transparent container' the target HeNB sends 606 in the HANDOVER REQUEST ACKNOWLEDGE message, and since the source eNB/HeNB then forwards 607 the 'transparent container' Information Element (IE) to the UE 601 in a HANDOVER COMMAND message, the UE 601 may start displaying 609 the string as soon as access to the new HeNB is completed 608.

A further embodiment of the invention may involve that the owner/administrator of the HeNB configures the HeNB identifier string to be sent to UEs that have been accepted by the access control and are allowed to use the HeNB.

In the following a list of exemplifying aspects of the invention is provided:

An aspect of the present invention relates to a method in a radio network node for indicating characteristics of a cell of the node to a mobile terminal accessing that cell. A node identifier string is provided to the terminal indicating cell specific properties that are applicable for that terminal within that cell.

According to one embodiment of this aspect of the invention, the node identifier string triggers displaying, on a user interface of the terminal, at least one of the cell specific properties applicable with the terminal.

This provides the advantage of informing a user of the mobile terminal of an access to a specific radio cell and the specifics of that cell, such as special rates, coverage area and nature of coverage, such as home or hotspot coverage, and so forth.

According to another embodiment of this aspect of the invention, the node identifier string triggers applying at least one of the properties for use with the terminal.

This provides the advantage of facilitating switching to the specific cell properties and functions/services valid or available only for terminals accessing that cell, such as special call and transaction rates/charges.

According to a further embodiment of this aspect of the invention, the UE specific cell properties comprise at least one of a node identity text string, cell identity text string, tariff data, cell performance data, and an application or service function, such as local switching to one or several other node users. The cell performance data may for example comprise data on cell coverage.

Thereby specific and extensive information on the currently accessed cell's properties, functions and services may be made available to the terminal user.

In yet another embodiment of this aspect of the invention, the node identifier string provided is transmitted in an RRC CONNECTION SETUP message following a RRC CONNECTION REQUEST message from the terminal. The RRC CONNECTION REQUEST may either be triggered by a flag, such as data bit of a certain value, being broadcasted periodically in said cell or triggered by a terminal or an end user interaction, such as bearer or call setup, SMS sending, SMS receiving or the like.

This provides the advantage of facilitating and optimizing data communication by utilizing existing communication channels and protocols for transmitting the node identifier string.

According to yet another embodiment of this aspect of the invention, the node identifier string is provided broadcasted via System Information Broadcast in the cell.

According to a still further embodiment of this aspect of the invention, the node identifier string is provided transmitted to the terminal comprised in a handover command message during a handover procedure from another cell (source) to the cell (target). The identifier being forwarded to the terminal from a node of the other cell (source) following being received therein comprised in a handover request acknowledge message from the node of the cell (target) to the node of the other cell (source).

A further embodiment of this aspect of the invention comprises that the node is a base station such as an eNB or HeNB.

A yet further embodiment of this aspect of the invention comprises that the node identifier comprises at least one of node identity data, cell identity data, CSG identity data and tracking area identity data.

Another aspect of the invention relates to a method implemented in a mobile terminal accessing a radio network cell for indicating characteristics of said cell on said terminal. A node identifier string received in the terminal provided from a node of the cell indicates cell specific properties applicable with the terminal within that cell. One embodiment of this aspect of the invention comprises comparing the node identifier with a cell indicator associating to a set of cell specific properties being pre stored in a memory space of said terminal and at least one of displaying and applying the cell properties of the indicator matching the identifier.

An advantage with this is that the user is able to customize the text strings of the cell properties that apply for the mobile terminal individually in the terminal.

In another embodiment of this aspect of the invention, the node identifier comprises data of the cell properties, which properties are at least displayed on the terminal following receipt therein.

In yet another embodiment of this aspect of the invention, at least one of the properties is manually selectable for use with the terminal.

The features described above in relation to the methods according to the invention may, where applicable, also be implemented in arrangements according to the invention with the same advantages as described in relation to the methods.

It should be noted that the word "comprising" does not exclude the presence of elements or steps other than those listed and the words "a" or "an" preceding an element do not exclude the presence of a plurality of such elements. It should further be noted that any reference signs do not limit the scope of the claims, and that several "means", "units" or "devices" may be represented by the same item of hardware, and that at least part of the invention may be implemented in either hardware or software.

The above mentioned and described embodiments are only given as examples and should not be limiting to the present invention. Other solutions, uses, objectives, and functions within the scope of the invention as claimed in the below described patent claims should be apparent for the person skilled in the art.

The invention claimed is:

1. A method in a radio network access node in a radio access network, for indicating characteristics of a cell of said access node to a mobile terminal accessing said cell through said access node comprising:
   sending a node identifier to said terminal, the node identifier comprising a pointer for a node identifier string indicative of cell specific properties specifically applicable with said terminal within said cell; and
   if the sent node identifier matches a node identifier pre stored in said terminal resulting in said terminal establishing a Radio Resource Control (RRC) connection to said access node, then providing the node identifier string to said terminal from said access node over the established RRC connection.

2. The method according to claim 1, wherein said cell specific properties comprise at least one of a node identity text string, cell identity text string, charge tariff data, cell performance data, and an application or service function, wherein said application or service function comprises local switching to one or several other node users.

3. The method according to claim 2, wherein said performance data comprises cell coverage data.

4. The method according to claim 1, further comprising steps of:
receiving a RRC connection request message from said terminal;
providing the node identifier string in an RRC connection setup message; and
transmitting the RRC connection setup message.

5. The method according to claim 4, further comprising a step of broadcasting an information message periodically in said cell and wherein the broadcasted information message is arranged to trigger the RRC connection request.

6. The method according to claim 4, wherein the broadcasted information message comprises a flag.

7. The method according to claim 1, further comprising a step of providing said node identifier string to said terminal in a handover command message during a handover procedure from another cell to said cell.

8. The method according to claim 7, wherein said node identifier string is forwarded to said terminal from a node of said other cell following being received therein comprised in a handover request acknowledge message from the node of said cell to the node of said other cell.

9. A method implemented in a mobile terminal accessing a radio network access cell in a radio access network, for indicating characteristics of said cell on said terminal, comprising the steps of:
receiving a node identifier provided from a network access node of said cell, said identifier comprising a pointer for a node identifier string indicative of cell specific properties specifically applicable with said terminal within said cell;
matching said received node identifier with a pre stored node identifier;
if the received node identifier matches the pre stored node identifier and if an associated pre stored node identifier string exists and associates to a set of terminal specific cell properties, using the pre stored node identifier string in the terminal; and
if the received node identifier matches the pre stored node identifier but an associated pre stored node identifier string does not exist, then:
obtaining the node identifier string from the network access node;
associating the obtained node identifier string with the pre stored node identifier; and
using the obtained node identifier string in the terminal.

10. The method according to claim 9, wherein the step of obtaining the node identifier string from the network access node comprise receiving a radio resource control connection setup message comprising the node identifier string.

11. The method according to claim 9, wherein at least one of said cell properties being manually selectable for use with said terminal.

12. An access node of a telecommunications network, arranged to indicate characteristics of a radio cell of said access node to a mobile terminal accessing said cell, wherein the access node is configured to:
send a node identifier to said terminal, the node identifier comprising a pointer for a node identifier string indicative of cell specific properties specifically applicable with said terminal within said cell; and
if the sent node identifier matches a node identifier pre stored in said terminal resulting in said terminal establishing a Radio Resource Control (RRC) connection to said access node, then provide the node identifier string to said terminal from said access node over the established RRC connection.

13. The access node according to claim 12, further arranged to provide the node identifier string in a RRC message.

14. A mobile terminal accessing a radio cell of an network access node in a telecommunications network, arranged to indicate characteristics of said cell, wherein said terminal is arranged to:
receive a node identifier provided from the network access node of said cell, said node identifier comprising a pointer for a node identifier string indicative of cell specific properties specifically applicable with said terminal within said cell;
match the received node identifier with a node identifier pre stored in the memory of the terminal;
if the received node identifier matches the pre stored node identifier and an associated pre stored node identifier string exists and associates to a set of terminal specific cell properties, the terminal is arranged to use the pre stored node identifier string in the terminal; and
if the received node identifier matches the pre stored node identifier but an associated pre stored node identifier string does not exist, the terminal is arranged to:
obtain the node identifier string from a network access node;
associate the obtained node identifier string with the pre stored node identifier; and
use the obtained node identifier string in the terminal.

15. The terminal according to claim 14, further arranged to display at least one of the terminal specific cell properties in a user interface of the terminal.

16. The terminal according to claim 14, further arranged to apply at least one of the terminal specific cell properties in the terminal.

* * * * *

UNITED STATES PATENT AND TRADEMARK OFFICE
CERTIFICATE OF CORRECTION

PATENT NO.         : 8,553,661 B2                                        Page 1 of 1
APPLICATION NO.    : 12/673532
DATED              : October 8, 2013
INVENTOR(S)        : Nylander et al.

It is certified that error appears in the above-identified patent and that said Letters Patent is hereby corrected as shown below:

On the Title Page, in Item [75], under "Inventors", in Column 1, Line 1, delete "Varmdo" and insert -- Värmdö --, therefor.

On the Title Page, in Item [75], under "Inventors", in Column 1, Lines 2-3, delete "Jari Vickberg," and insert -- Jari Tapio Vikberg, --, therefor.

On the Title Page, in Item [75], under "Inventors", in Column 1, Line 3, delete "Jarna" and insert -- Järna --, therefor.

Signed and Sealed this
Twenty-ninth Day of April, 2014

Michelle K. Lee
*Deputy Director of the United States Patent and Trademark Office*